United States Patent [19]

Morgan

[11] 4,221,440
[45] Sep. 9, 1980

[54] TAPE CARTRIDGE HOLDER

[76] Inventor: Jerry A. Morgan, 7362 Pegasus Way, San Jose, Calif. 95139

[21] Appl. No.: 964,289

[22] Filed: Nov. 28, 1978

[51] Int. Cl.² .......................................... A47B 81/06
[52] U.S. Cl. ................................... 312/11; 312/186; 312/305; 206/387
[58] Field of Search .................... 312/11, 8, 9, 10, 305, 312/186, 41, 125, 135; 206/387, 316; 242/84.8, 107.3; 297/373, 374

[56] References Cited

U.S. PATENT DOCUMENTS

| 796,199 | 8/1905 | Ellett et al. | 312/305 |
| 2,363,574 | 11/1944 | Cowan | 312/10 |
| 3,601,249 | 8/1971 | Larsson | 206/387 |
| 3,692,376 | 9/1972 | McKinsey et al. | 312/11 |
| 3,736,036 | 5/1973 | Mathus | 312/11 |
| 3,765,738 | 10/1973 | Cobb | 312/11 |
| 3,858,720 | 1/1975 | Flagler | 206/387 |
| 3,889,817 | 6/1975 | Berkman | 312/11 |
| 4,057,305 | 11/1977 | Zboeblick | 312/11 |

*Primary Examiner*—Victor N. Sakran
*Attorney, Agent, or Firm*—Don B. Finkelstein

[57] ABSTRACT

A storage arrangement for storing tape cassettes, eight track tape cartridges and the like, in which a case means is provided having walls defining a storage volume therebetween. A carousel comprising a pair of disc means is rotatably mounted in the storage volume and is supported by the side walls of the case means. The pair of disc means each have a plurality of cartridge holding means for retaining a plurality of the cartridges between the pair of disc means in a preselected array and in separate cartridge holding sections. The pair of disc means are maintained in a spaced apart relationship by a hub means and the disc means and hub means rotate relative to the case means about a horizontal axis. Brake means are provided intermediate the disc means and the case means to provide a predetermined frictional force therebetween. The predetermined frictional force is at least as great as that sufficient to resist rotation of the disc means and hub means about the horizontal axis under the force of gravity for the maximum unsymmetrical load condition of cartridges stored in the cartridge storing sections, but is not as great as that necessary for manual rotation.

18 Claims, 9 Drawing Figures

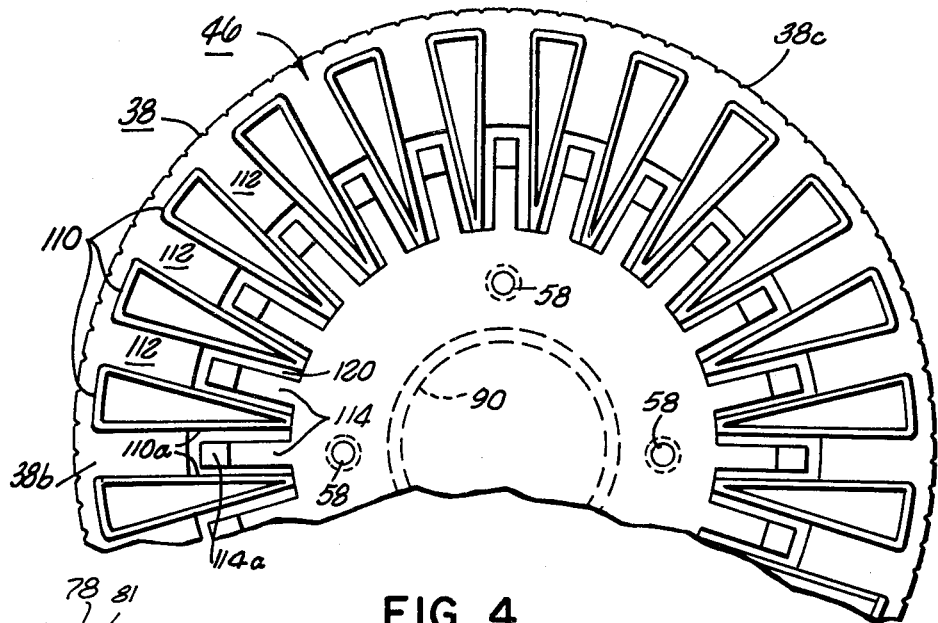
FIG. 4
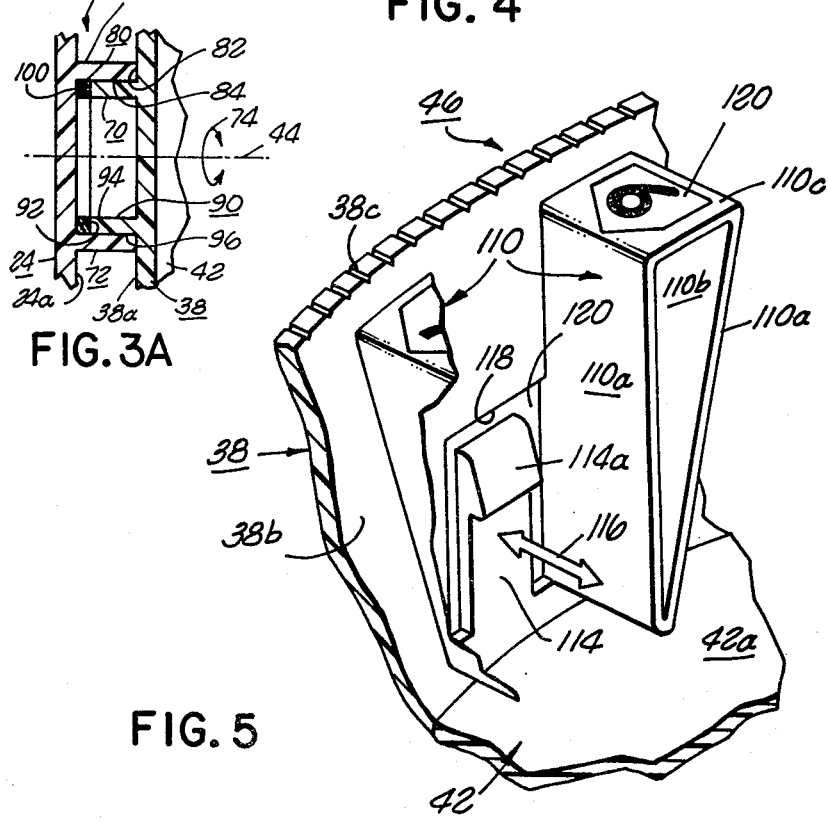
FIG. 3A
FIG. 5

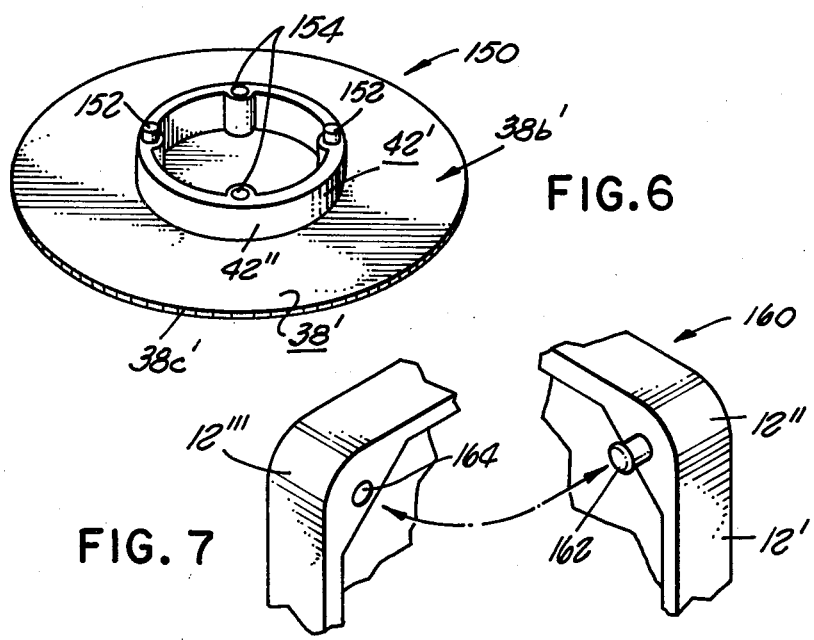
FIG.6
FIG.7
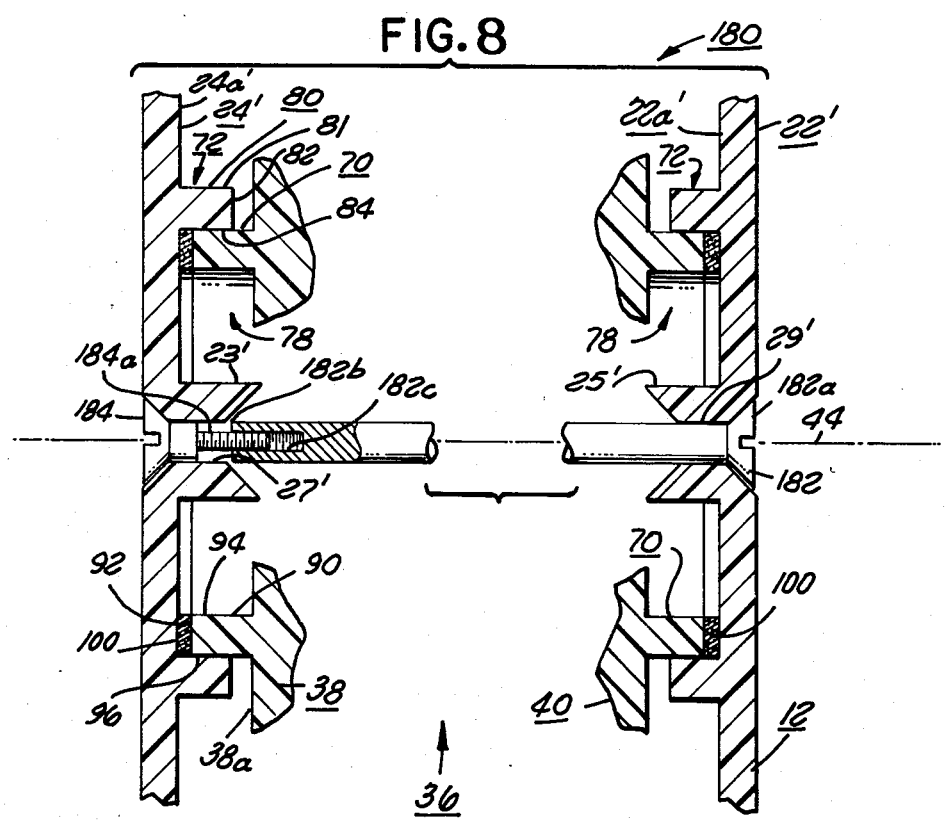
FIG.8

TAPE CARTRIDGE HOLDER

BACKGROUND OF THE INVENTION

1. Field of the Invention

This invention relates to the storage art and, more particularly, to an arrangement for storing tape cassettes, eight track tape cartridges and the like.

2. Description of the Prior Art

In recent years there has been a dramatic increase in utilization of tape cassettes, tape cartridges, and the like in both private and commercial applications. This increase in utilization of such structures has necessitated arrangements for storage thereof. Preferably, the storage arrangement for such structures provides easy access to the stored cassettes, cartridges, or the like, as well as indexing of particular such structures, so that the location within the storage arrangement of a particular tape cassette or tape cartridge may be rapidly and easily ascertained.

Prior art structures utilized for storing such tape cassettes or cartridges have not proven completely satisfactory. For example, in U.S. Pat. No. 3,765,738, there is shown a storage arrangement for holding tape cassettes which is mounted for rotation about a vertical axis. Rotation about a vertical axis has, in many applications, proven impractical and/or inconvenient. Similarly, U.S. Pat. No. 3,962,287 shows a cassette storage arrangement wherein a drum is provided mounted for rotation about a vertical axis and the drum has provisions for accepting a plurality of tape cassettes. While this patent mentions that the drum may be rotated about a horizontal axis, there is no particular recitation therein, nor any showing of, a braking arrangement to prevent the rotation of the drum, if it should be mounted for rotation about a horizontal axis, under the force of gravity when the drum may be in an unsymmetrically loaded condition such that the weight of stored cassettes and/or cartridges provides a moment for rotation about such a horizontal axis.

U.S. Pat. No. 3,765,738 shows a cassette holder mounted for rotation about a vertical axis, but does not show any arrangement for braking or restraining the rotational movement of the structure utilized for holding cassettes.

U.S. Pat. No. 3,858,720 shows a non-rotating type of storage arrangement which includes an access door to provide access to the stored tape cassettes and/or cartridges maintained therein.

U.S. Pat. No. 3,601,249 shows another "carousel" type of arrangement for storing magnetic tape reels in which the drum for holding the tape reels is mounted for rotation about a vertical axis.

U.S. Pat. No. 4,057,305 shows another "carousel" type of arrangement for rotation about a horizontal axis wherein the carousel holds a plurality of tape cassettes, but has no "braking" provision and has not proven to be adaptable to all applications.

None of the above mentioned prior art devices can provide a convenient tape cassette and/or tape cartridge storage arrangement in which the tape cassettes and/or cartridges are mounted for rotation about a horizontal axis, which structure is often desired for convenience and accessibility and storage.

Thus, there has long been a need for a storage arrangement for storing tape cassettes, tape cartridges, or the like, in a rotary holding arrangement wherein the holding arrangement is mounted for rotation about a horizontal axis, but is restrained to remain in any given position.

SUMMARY OF THE INVENTION

Accordingly, it is an object of the present invention to provide an improved storage arrangement.

It is a further object of the present invention to provide an improved storage arrangement for storing tape cassettes, tape cartridges, or the like.

It is yet another object of the present invention to provide an improved storage arrangement of the carousel type in which the carousel for holding a plurality of tape cassettes, eight track cartridges, or the like, is mounted for rotation about the horizontal axis.

It is yet another object of the present invention to provide a storage arrangement for tape cassettes, tape cartridges, or the like which is mounted on a carousel for rotation about a horizontal axis and in which a brake means is provided to prevent rotation of the carousel under the force of gravity for the maximum non-symmetric loading condition thereof.

It is yet another object of the present invention to provide an improved storage arrangement for tape cassettes, cartridges, or the like, that may be economically fabricated and of comparatively long service life and utility.

The above, and other objects of the present invention are achieved, in a preferred embodiment thereof, by providing a case means having a plurality of walls defining a storage cavity. The walls of the case means are a top wall, front wall, back wall, bottom wall, and a pair of opposed side walls. The storage arrangement is adapted to rest upon the bottom wall.

A carousel structure is provided within the storage cavity comprised of a pair of disc means movably mounted in the storage cavity for rotary movement about a horizontal axis. The pair of disc means detachably retain a plurality of tape cassettes, tape cartridges, or the like, therebetween. As utilized herein, the terminology of "cartridges" is utilized to define the objects which may be stored in the structure of the present invention. That is, in the present state of the art, there are provided structures known as tape cassettes, structures known as eight track tape cartridges, structures known as tape reels and the like. The term "cartridges" is utilized herein to define all such objects as may be conveniently stored in the structure of the present invention.

Each of the disc means of the carousel is provided with a peripheral surface, an outer surface, and an inner surface. The outer surface of each of the disc means has a support means engaging a bearing surface on the inside surface of the side walls of the case means to support the disc means in a rotary moving mounting arrangement for rotation about a horizontal axis. The disc means are maintained in a spaced apart relationship by a hub means extending therebetween and the hub means has an external surface spaced a predetermined distance from the peripheral surface of the disc means. A plurality of aligned cartridge holding means are provided on the inner surfaces of the disc means for detachably holding the cartridges in a plurality of discrete cartridge holding sections thereof.

A brake means is provided intermediate the bearing surface of the side walls of the case means and the support means on the outer surfaces of the disc means to provide a predetermined frictional force therebetween to resist rotation of the disc means relative to the case means.

If desired, there may be provided a door means pivotally mounted on the case means and walls in the case means defining an access aperture therethrough. The access aperture in the case means allows convenient insertion and removal of the cartridges from the cartridge storing section of the carousel and the door means may close the access aperture in a closed condition thereof.

BRIEF DESCRIPTION OF THE DRAWING

The above and other embodiments of the present invention are illustrated in the accompanying drawing wherein similar reference characters refer to similar elements throughout and in which:

FIG. 3A illustrates a brake means useful in the practice of the present invention;

FIG. 4 is a view of a disc means useful in the practice of the present invention;

FIG. 5 is a perspective view illustrating the cartridge holding means according to the principles of the present invention;

FIG. 6 illustrates an alternative embodiment of a disc and hub means according to the principles of the present invention;

FIG. 7 illustrates an alternative embodiment of a case means according to the principles of the present invention; and, FIG. 8 illustrates another embodiment of the present invention.

DESCRIPTION OF THE PREFERRED EMBODIMENTS

Figure 1:
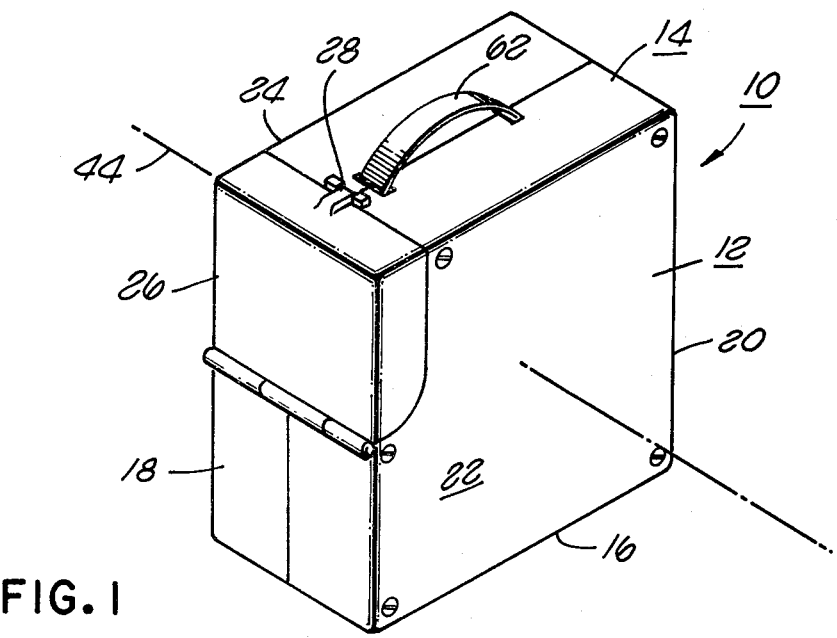
FIG. 1 is a perspective view of a preferred embodiment of the present invention showing the access door in the closed condition thereof.
Figure 2:
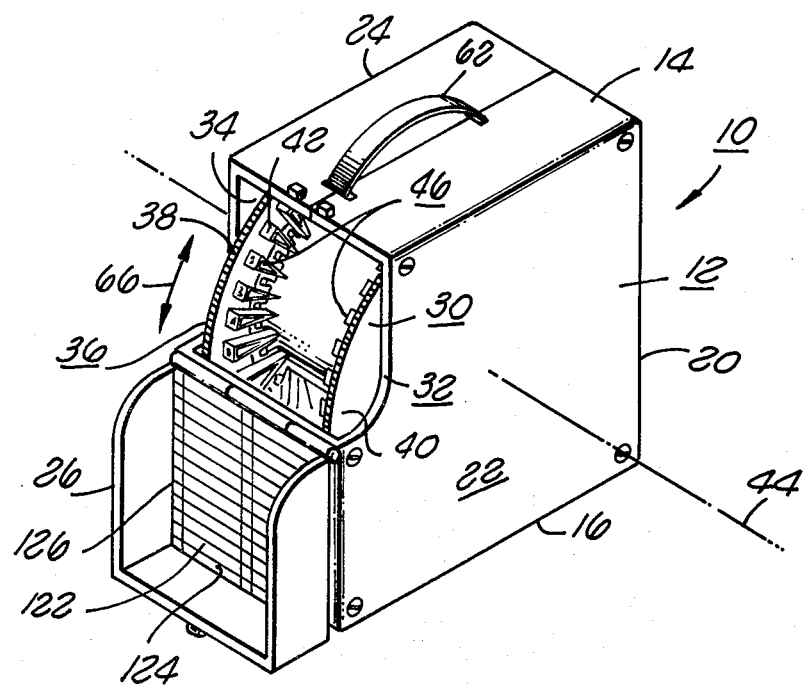
FIG. 2 is a perspective view of a preferred embodiment of the present invention showing the access door in the open position thereof.

Referring now to the drawing, there is illustrated in FIGS. 1 and 2 a perspective view of a preferred embodiment of the present invention, generally designated 10. As shown in FIGS. 1 and 2, there is provided a case means generally designated 12 having a planar top wall 14, a planar bottom wall 16 oppositely disposed to said top wall 14, a planar front wall 18, a planar rear wall 20 oppositely disposed to said front wall 18, and a pair of planar side walls 22 and 24.

The planar top wall 14, bottom wall 16, front wall 18 and rear wall 20 allow convenient utilization of a plurality of the tape cartridge storage arrangements 10 in side-by-side, front-to-rear or vertically stacked configurations thereby being most economical of space.

There is also shown a door means 26, pivotally mounted on the case means 12, and shown in FIG. 1 in the closed position thereof, detachably retained in said closed position by latch means 28. The door means 26 is shown in the open condition thereof in FIG. 2 showing access aperture 30 defined by walls 32 of case means 12.

The top wall 14, bottom wall 16, front wall 18, back wall 20 and side walls 22 define a storage cavity 34 therein which contains a carousel generally designated 36, comprised of a pair of disc means 38 and 40. The disc means 38 and 40 are maintained in a spaced apart relationship by a hub means 42 and the disc means 38 and 40 and hub means 42 are mounted for rotational movement about a horizontal axis 44 by structure hereinafter described. The disc means 38 and 40 are provided with a plurality of cartridge holding means 46 defining a plurality of cartridge storing sections, as described below in greater detail.

Figure 3:
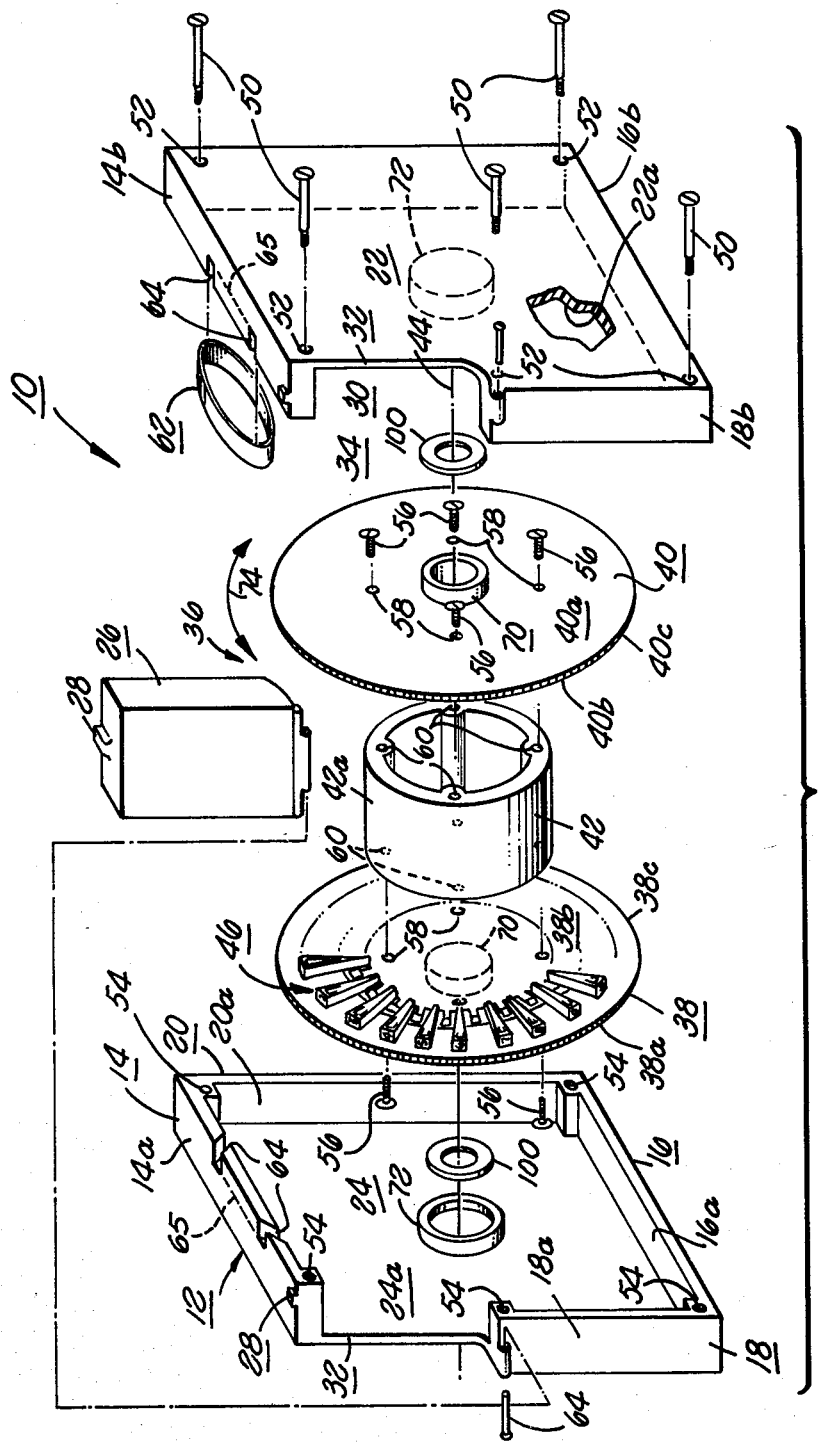
FIG. 3 is an exploded view of the structure associated with the preferred embodiment of the present invention illustrated in FIGS. 1 and 2.

Referring now to FIG. 3, there is shown an exploded view of the preferred embodiment of the present invention generally illustrated in FIGS. 1 and 2.

As shown in FIG. 3, in the preferred embodiment 10 of the present invention, the top wall 14, bottom wall 16, front wall 18, and back wall 20 of case means 12 are divided into two portions 14a and b, 16a and b, 18a and b and 20a and b respectively. The portions 14a, 16a, 18a and 20a are unitarily molded with side wall 24. The portions 14b, 16b, 18b and 20b are unitarily molded with side wall 22. The case means 12 is joined together by, in this embodiment of the present invention, a plurality of screw means 50, extending through apertures 52 in the side wall 22, and threadingly engaging aligned apertures 54 in the unitarily molded side wall 24. Other methods of assembly of the case means 12 may also be used in accordance with the principles of the present invention, as discussed below in connection with FIG. 7.

The carousel 36, as noted above, is comprised of the pair of disc means 38 and 40 and hub means 42. In the embodiment 10, shown in FIG. 3, the carousel 36 is coupled together by a plurality of screws 56 extending through apertures 58 in each of the pair of disc means 38 and 40 and extending into and threadingly engaging aligned apertures 60 in hub means 42, thereby coupling together the hub means 42 and pair of disc means 38 and 40. The disc means 38 and 40 are substantially identical.

To provide convenient portability, a handle means 62 may be provided on the top wall 14, and, in the preferred embodiment 10 shown in FIG. 3, generally comprises a continuous strap mounted in aligned slots 64 in each of top portions 14a and 14b, and is inserted therein prior to the assembly of the case means 12 for retention. A recess, generally shown in dotted lines 65 may be provided in top wall 14 to accept the handle 62 when vertical stacking is desired.

The door means 26 is pivotally mounted on the front wall 18 by pivot pin 64 for movement in the direction indicated by the arrow 66 (FIG. 2), from its closed condition adjacent to the walls 32 defining the access aperture 34 where it is retained by latch means 28, which, for example, may be any type of conventional latch, to the open position.

Each of the disc means 38 and 40 have an outer surface 38a and 40a, respectively, an inner surface 38b and 40b, respectively, and peripheral surfaces 38c and 40c, respectively. Support means generally designated as 70 are provided on the outer surfaces 38a and 40a, respectively, of the disc means 38 and 40, for purposes hereinafter described.

Bearing surface means 72 are provided on the inside surface 24a and 22a, of the side walls 24 and 22, and within the storage volume 34 of the case means 12. The bearing surface means 72 and the support means 70 cooperate to suppport the carousel 36 in the case means 12 and to provide a brake means for resisting the rotary movement of the carousel 36 in the directions indicated by the arrow 74 about the horizontal axis 44.

FIG. 3A illustrates a preferred embodiment for the brake means generally designated 78 according to the principles of the present invention. As shown in FIG. 3A, the bearing surface means 72 comprises a first annular ring means 80, coupled to the inside surface 24a of the side wall 24 and having a predetermined axial length in the direction of the axis 44 from the inside surface 24a of the side wall 24 to an outer annular end surface 82 of the first annular ring means 80. The first annular ring means 80 also has a predetermined inner diameter to an inner surface 84 and a first predetermined wall thickness between the inner surface 84 and on outer surface 81.

The support means 70 on the inner surface 38a of disc means 38 is comprised of a second annular ring means 90, having outer annular end surface 92, spaced a second predetermined axial length in the direction of the axis 44 from the outer surface 38a of the disc means 38. The support means 70 also has a second predetermined inner diameter to an inner surface 94, and a second predetermined wall thickness to an outer surface 96. The diameter of the second annular ring means 90 to the outer surface 96 is, in the preferred embodiment 10, less than the diameter of the inner surface 84 of the first annular ring means 80 to provide the interfitting relationship therebetween as illustrated in FIG. 3A to provide the support mounting for the carousel 36 in the case means 12 for the rotary motion about the axis 44 in the direction indicated by the arrow 74. A brake pad 100 is provided intermediate the outer end surface 92 of the second annular ring means 90 and regions of the inside surface 24a of the side wall 24 contained within the inner diameter of the inner surface 84 of the first annular ring means 80. The brake pad 100 may, for example, be fabricated of rubber, resilient plastic, or the like and provides a predetermined frictional force resisting the rotary movement of the carousel 36 in the direction indicated by the arrow 74 about the axis 44 and the predetermined frictional force is a force that is at least as great as that necessary to resist rotary movement of the carousel 36 under the force of gravity and less than the force necessary to allow manual rotation of the carousel 36 about the axis 44. It has been found, according to the principals of the present invention, that in many instances, the carousel 36 may be unsymmetrically loaded with the cartridges contained in the cartridge holding means 46. Such unsymmetrical loading tends to cause the carousel 36 to rotate about the axis 44 under the force of gravity until the centroid of the weight of the unsymmetrical loading is in a vertical plane containing the axis 44. Such movement, if allowed, does not provide convenient access to each of the cartridges which may be stored in the cartridge holding means 46. Thus, the brake means 78 prevents such rotation, and, in the embodiment 10, as illustrated in FIG. 3A, the brake pad means 100 provides the necessary resistance to such rotary motion of the carousel 36 under the force of gravity. Therefore, the carousel 36 will remain in any given orientation once it has been manually positioned.

It will be appreciated, of course, that the brake pad 100 could be positioned between the outer end surface 82 of the first annular ring means 80 and the inner surface 38a of the side wall 38 to provide the same type of resistive force. Similarly, a brake pad may be inserted between the inner surface 84 of first annular ring means 80 and outer surface 96 of second annular ring means 90 to provide the braking frictional force. Additionally, the fit of the first annular ring means 80 with the second annular ring means 90 can, if properly selected, also provide the frictional force to comprise the brake means 78, thereby eliminating the pad 100. Similarly, the first annular ring means 80 may be positioned within the second annular ring means 90. It will be appreciated that all such variations and combinations of brake means for resisting rotary movement about the axis 74 are within the scope and spirit of the present invention and, as set forth herein and in the appended claims.

It will be appreciated, of course, that the braking and mounting arrangement for the disc 40 with the side wall 22 is identical to that illustrated in FIG. 3a.

As noted above, the carousel 36 also comprises a plurality of cartridge holding means 46 for detachable holding of a plurality of cartridges therin. These are illustrated in perspective view on FIG. 3 and in greater detail on FIGS. 4 and 5.

With reference to the drawing and in particular FIGS. 4 and 5, the cartridge holding means 46, which is illustrated for disc means 38 and which is identical to the structure incorporated on disc means 40 are coupled to the inner surface 38b of disc means 38. The cartridge holding means 46 are generally comprised of a plurality of aligned guide rail members 110 aligned between the disc means 38 and disc means 40, which are in spaced apart relationship. The guide rails 110 extend radially from regions adjacent the outer surface 42a of the hub means 42 to regions adjacent to peripheral surface 38c to provide a plurality of separate cartridge holding sections 112 between adjacent pairs of guide rail members 110. The facing surfaces 110a of adjacent guide rail members 110 are parallel and are spaced apart in an amount sufficient to allow insertion of the particular type of cartridge therebetween.

A plurality of aligned clip means generally designated 114 are provided in the cartridge holding sections 112 and the clip means 114 are resiliently mounted for movement in the directions indicated by the arrow 116 on FIG. 5. The movement of the clip means 114 is resilient and to allow movement in the direction indicated by the arrow 116 into and out of the plane defined by the disc means 38, there is provided walls 118 in the disc means 38 defining the clearance space 120 between preselected portions, that is, the sides and outer end of the clip means 114 and the disc 38. The head portion 114a illustrated in the preferred embodiment 10 on FIGS. 4 and 5 resiliently engages a matching indentation in, for example, the conventional cassette. Depending upon the type of configuration of the cartridge to be stored, the shape of the clip means 114 may be varied so that frictional engagement thereof for detachably retaining the cartridge in the cartridge holding sections 112 will be obtained. The resilient movement of the clip means 114 in the directions indicated by the arrow 116 allows the detachable holding of the cartridges so they may be inserted and removed as desired.

The guide rail member 110, in the preferred embodiment of the invention, are generally of a comparatively thin-walled section defining an open volume 110b, therebetween on any one guide rail 110. The guide rails 110 and clip means 114 are, in preferred embodiments of the present invention, unitarily molded with the disc means 38 and disc means 40.

In order to provide identification of the particular cartridge contained within each cartridge holding section 112, first indicia means 120 are provided on the outer surface 110c of each guide rail member 110, as illustrated in FIG. 5. The indicia may, for example, be numbers, letters, or other signs or symbols. As shown in FIG. 2, the door means 26 is provided with a chart means 122 on the inside surface thereof and the chart means 122 has a plurality of recording sections 124 and second indicia means 126 which correspond to the first indicia means 120 and adjacent each of the recording spaces 124. Preferably, the chart means 122 is contained on the inside surface of the door means 26 so that it is visible when the door means 26 is in the open position as illustrated in FIG. 2. Thus, when the door means 26 is open, the identity of a particular cartridge contained in any cartridge holding section 112 may be readily identified by a comparison of the material recorded on the chart means 122 and the corresponding indicia 126 and 120.

The outer surface 42a of the hub means 42 may, if desired, cooperate with cartridge holding means 46 so that cartridges may be inserted into the cartridge holding sections 112 only a predetermined distance and thereby prevent cartridges from being inserted into an inaccessible location.

FIG. 6 illustrates an alternative embodiment of the present invention generally designated 150 for a modified structure of the disc means and hub means. As noted above, the hub means 42 is a separate structure from the disc means 38 and disc means 40, and was coupled thereto by the screws 56 and 58. However, the hub means 42 may also be divided into two portions and each portion unitarily molded with one of the disc means 38 and 40. As shown in FIG. 6 in the embodiment 150, the hub means, generally designated 42 has a first portion 42" coupled to inside surface 38b of disc means 38' and there would be a corresponding similar hub portion on disc means 40' (not shown in FIG. 6.) The portion 42" of hub means 42" is provided with a pair of tab means 152 and a pair of tab receiving apertures 154. The other portion of the hub means 42' which would be coupled to the inside surface of disc means 40 would be similarly constructed. Consequently, the tab means 152 of one portion of the hub means 42' would be insertable in the tab receiving apertures 154 of the other portion of the hub means 42'. The tabs 152 may be resilient tabs for resilient frictional retention, or, if desired, may be bonded or glued in their respective apertures 154. Preferably, in the embodiment 150, each of the portions of the hub means 42' are unitarily molded with the corresponding disc means 38 and 40. The rail means and clip means on disc means 38' have been omitted for clarity. Disc means 38' and 40' may be similar to disc means 38 and 40 described above.

FIG. 7 illustrates an alternative embodiment for coupling together the case means 12. As noted above, the case means 12 is coupled together by the screw means 50. However, in the embodiment 160, shown in FIG. 7, the case means 12', which may be generally similar to the case means 12, has a first portion 12" provided with a resilient tab means 162 which fits into a tab receiving aperture 164 in the other portion 12" of the case means 12' in a manner similar to that described above in connection with FIG. 6. The tab means 162 are preferably unitarily molded with the portion 12" of cae means 12'.

In some applications of the present invention it may be desirable to provide a structure for adjusting the frictional force of the brake which resists the rotation of the carousel 36 under the force of gravity. For example, after a comparatively long service life, where change in the characteristics of the brake pad, or the like, may lessen the friction force of the brake means 38 so that rotation under the force of gravity due to an unsymmetrical loading condition results. Further, depending upon the particular type of fabrication and assembly, tolerance build up, tolerance variations or the like, may result in either too great or too little a frictional force when the unit is assembled. FIG. 8 illustrates an embodiment generally designated 180 in which the frictional force of the brake means 78 may be varied. In the embodiment 180 there is provided a case means 12 generally comprised of the side walls 24' and 22' which, in general, may be similar to the side walls 24 and 22 described above, and between which there is supported a carousel 36. The inside surface 24a' of side wall 24' is provided with a bearing surface means 72, which, in conjunction with the support means 70 on the outside surface 38a of disc 38 support the carousel 36 for rotary movement about the axis 44. The bearing surface means 72 and support means 70 are similar to the comparable structure described above. A brake pad 100 is intermediate the inside surface 24a contained within the bearing surface means 22 and abuts against the end wall 92 of the second angular ring means 90 of the support means 70, all of which structure is similar to that described above.

However, in the embodiment 180 shown in FIG. 8, the side walls 24' and 22' are provided with bosses 23' and 25' extending inwardly from the inner surfaces 24a' and 22a' of the side walls 24' and 22', respectively. Each of the bosses 23' and 25' are provided with walls defining an aperture 27' and 29', respectively, centered about the axis of rotation 44. A first screw means 182 extends through the aperture 29' in boss 25' of side wall 22' to the carousel 36 to regions adjacent the boss 23' of side wall 24'. The screw means 182 has a headed end 182a at the side wall 22' and a remote end 182b which is in regions adjacent to boss 23'. The screw means 182 has an axial threaded aperture 182c.

A second screw means 184 is inserted through the aperture 27' in the boss 23' and has a threaded portion 184a adapted to threadingly engage the threaded axial aperture 182c of the first screw means 182.

Both first screw means 182 and second screw means 184 only frictionally engage the side walls 22' and 24' and their respective apertures 25' and 27' and do not have a threading engagement therewith.

By tightening the second screw means 184 into the threaded aperture 182c of the first screw means 182, the side walls 22' and 24' may be drawn together thereby increasing the force on the brake pads of 100 and thereby increasing the frictional force provided. Thus, manufacturing tolerances and the like may be counteracted by proper adjustment of the compressive force on the brake pads 100 by adjustment of the first screw means 182 and second screw means 184. The adjustment means illustrated in embodiment 180 as shown in FIG. 8 may be utilized with any of the embodiments of the present invention to provide the desired variation in the frictional force of the brake means 78.

From the above, it can be seen that there has been provided an improved arrangement for storing cartridges of various forms and configurations for rotation about the horizontal axis. Those skilled in the art may find many variations and adaptations of applicant's invention set forth herein, and all such variations and adaptations are intended to be covered by the appended claims.

I claim:

1. A tape cartridge storage arrangement comprising, in combination:

a case means having a plurality of planar walls defining a storage cavity, and said plurality of planar walls comprising a front wall, a back wall oppositely disposed to said front wall, a top wall, a bottom wall oppositely disposed to said top wall and a pair of oppositely disposed side walls, and said oppositely disposed side walls having aligned bearing surface means thereon within said storage cavity;

a carousel means movably mounted in said storage cavity, for rotary movement about a horizontal axis, and said carousel means comprising a pair of disc means in spaced apart relationship for detachably holding a plurality of cartridges therebetween, and each of said pair of disc means having:
  a peripheral surface;
  an outer surface;
  an inner surface;
  support means on said outer surface thereof for engaging said bearing surface means of said side walls of said case means for said rotary movement mounting thereof;
  and a plurality of aligned cartridge holding means on said inner surfaces for detachably holding the cartridges therein;
hub means coupled to said inner surfaces of said pair of disc means for providing said spaced relationship thereof, and said hub means having an outer surface spaced a predetermined distance from said peripheral surface of said disc means; and
brake means intermediate said bearing surface means of said side walls of said case means and said support means of said disc means for applying a predetermined frictional force therebetween to resist said rotary movement of said disc means.

2. The arrangement defined in claim 1 wherein:
said cartridge holding means on said disc means further comprises:
  an aligned plurality of guide rail members in a predetermined spaced apart array on said inner surfaces of each of said disc means and said guide rail members extending from regions adjacent said hub means to regions adjacent said peripheral surface to divide said disc means into a plurality of separate cartridge holding sections; and
  an aligned plurality of clip means resiliently mounted on each of said disc means for resiliently engaging a cartridge to detachably retain a cartridge in each of said cartridge holding sections.

3. The arrangement defined in claim 2 wherein: said clip means further comprises:
an aligned plurality of clip members, one of said clip members intermediate each adjacent pair of said guide rail members on each of said disc means; and
walls on said disc means defining a clearance space between predetermined portions of each of said clip members and said disc means to allow resilient movement of each of said clip members into and out of the plane of each of said disc means.

4. The arrangement defined in claim 2 wherein:
said disc means, guide rail members and clip means are unitarily molded.

5. The arrangement defined in claim 1 wherein:
said predetermined frictional force comprises a force at least as great as that necessary to resist said rotary movement of said disc means and said hub means under the force of gravity and less than the force necessary for manual rotation of said disc means and said hub means.

6. The arrangement defined in claim 1 wherein:
said front wall of said case means further comprises:
  walls defining an access aperture therethrough for allowing insertion and removal of cartridges from said storage cavity; and
  door means movably mounted on said case means and having a closed condition for closing said access aperture and an open condition wherein said access aperture is exposed, whereby cartridges may be inserted and removed from said storage volume for said access door in said open condition thereof; and
  latch means for selectively holding said door means in said closed condition thereof; and
  handle means on said top surface of said case means.

7. The arrangement defined in claim 6 and further comprising:
first indicia means on said guide rail members for indicating each of said cartridge storage sections; and
chart means on the inside surface of said door means, and said chart means having:
  a plurality of recording spaces thereupon; and
  second indicia means corresponding to said first indicia means adjacent each of said recording spaces.

8. The arrangement defined in claim 1 wherein:
said brake means further comprises:
  a brake pad means intermediate and frictionally engaging each of said bearing surface means of said side walls of said case means and said support means of said outer surface of said disc means.

9. The arrangement defined in claim 8 wherein:
said bearing surface means on each of said pair of side walls of said case means further comprises:
  first annular ring means having an outer annular end surface, a first predetermined axial length from said outer annular end surface to said side wall of said case means, a first predetermined inner diameter to an inner surface, and a first predetermined wall thickness;
said support means on each of said outer surfaces of each of said disc means further comprises:
  a second annular ring means having an annular outer end surface, a second predetermined axial length, a second predetermined inner diameter to an inner surface, and a second predetermined wall thickness to define an outer surface thereof at a predetermined outer diameter less than said predetermined inner diameter of said first annular ring means; and
  at least a portion of said outer surface of said second annular ring means in supporting relationship to said inner surface of said first annular ring means to provide said mounting of said disc means for said rotary movement thereof.

10. The arrangement defined in claim 9 wherein said first predetermined axial length of said first annular ring means is greater than said second predetermined axial length of said second annular ring means;
said brake means further comprises:
  brake pad means intermediate and frictionally engaging each said outer end surface of said second annular ring means and said side walls of said case means in regions within said first annular ring means.

11. The arrangement defined in claim 10 and further comprising:
   adjustment means for varying said predetermined frictional force of said brake means.

12. The arrangement defined in claim 1 wherein:
   said top wall, said bottom wall, said front wall and said back wall of said case means are each comprised of a first portion and a second portion, and said first portions thereof unitarily molded with one of said pair of said walls and said second portions thereof unitarily molded with the other of said pair of side walls.

13. The arrangement defined in claim 1 wherein:
   said hub means further comprises:
   a first portion and a second portion, and said first portion of said hub means us unitarily molded with a first of said pair of disc means and said second portion of said hub means if unitarily molded with the other of said pair of disc means.

14. The arrangement defined in claim 13 wherein:
   said top wall, said bottom wall, said front wall and said back wall of said case means are each comprised of a first portion and a second portion, and said first portions thereof unitarily molded with one of said pair of side walls and said second portions thereof unitarily molded with the other of said pair of side walls.

15. The arrangement defined in claim 9 wherein:
   said outer surface of said second annular ring means frictionally engages said inner surface of said first annular ring means to provide said brake means.

16. The arrangement defined in claim 14 wherein:
   one of said first and second portions of each of said top wall, bottom wall, front wall and back wall of said case means has at least one tab accepting aperture therein and the other of said first and second portions thereof has at least one resilient tab means insertable in said tab accepting aperture for retention therein to couple said case means together.

17. The arrangement defined in claim 14 wherein:
   one of said first portion and said second portion of said hub means has at least one tab accepting aperture therein and the other of said first portion and said second portion of said hub means has at least one resilient tab means insertable in said tab accepting aperture for retention therein to couple said hub means together.

18. The arrangement defined in claim 11 wherein:
   each of said side walls of said means further comprises:
   a hub means having walls defining an aperture therethrough, and said aperture coaxially aligned about said horizontal axis;
   a first screw means extending through said aperture in a first of said side walls and having a remote and remote end in regions adjacent to said boss means on the other of said side walls, and said remote end of first screw means having walls defining a threaded aperture coaxially aligned with said horizontal axis;
   a second screw means inserted through said aperture in the other of said side walls and having a threaded portion threadingly engaging said threaded axial aperture of said first screw means.

* * * * *